(12) United States Patent
Mamrak et al.

(10) Patent No.: US 10,894,299 B2
(45) Date of Patent: Jan. 19, 2021

(54) FIXED BED LARGE SCALE ADDITIVE MANUFACTURING USING FOIL-BASED BUILD MATERIALS

(71) Applicant: GENERAL ELECTRIC COMPANY, Schenectady, NY (US)

(72) Inventors: Justin Mamrak, Loveland, OH (US); MacKenzie Ryan Redding, Mason, OH (US); Thomas Graham Spears, Springdale, OH (US); Mark Kevin Meyer, Dayton, OH (US)

(73) Assignee: General Electric Company, Schenectady, NY (US)

( * ) Notice: Subject to any disclaimer, the term of this patent is extended or adjusted under 35 U.S.C. 154(b) by 350 days.

(21) Appl. No.: 15/811,293

(22) Filed: Nov. 13, 2017

(65) Prior Publication Data

US 2019/0143444 A1 May 16, 2019

(51) Int. Cl.
| | |
|---|---|
| *B23K 15/00* | (2006.01) |
| *B33Y 10/00* | (2015.01) |
| *B33Y 30/00* | (2015.01) |
| *B23K 35/02* | (2006.01) |
| *B23K 15/08* | (2006.01) |
| *B23K 26/082* | (2014.01) |
| *B23K 26/342* | (2014.01) |
| *B33Y 70/00* | (2020.01) |

(52) U.S. Cl.
CPC .......... *B23K 15/0086* (2013.01); *B23K 15/08* (2013.01); *B23K 26/082* (2015.10); *B23K 26/342* (2015.10); *B23K 35/0255* (2013.01); *B33Y 10/00* (2014.12); *B33Y 30/00* (2014.12); *B33Y 70/00* (2014.12)

(58) Field of Classification Search
CPC ..... B33Y 30/00; B29C 64/268; B29C 64/321; B29C 64/223; B29C 64/141; B29C 64/147; B23K 26/342; B23K 26/0086; B23K 26/0093
See application file for complete search history.

(56) References Cited

U.S. PATENT DOCUMENTS

| | | | |
|---|---|---|---|
| 4,560,855 A | 12/1985 | Takafuji et al. | |
| 4,746,968 A * | 5/1988 | Wear | A23L 3/54 |
| | | | 219/685 |
| 4,937,768 A | 6/1990 | Carver et al. | |

(Continued)

FOREIGN PATENT DOCUMENTS

| | | |
|---|---|---|
| EP | 0554033 A1 | 8/1993 |
| WO | 97/39903 A1 | 10/1997 |

(Continued)

OTHER PUBLICATIONS

International Search Report and Written Opinion for application PCT/US2018/060665 dated Mar. 7, 2019 (10 pages).

*Primary Examiner* — Erin Deery (74) *Attorney, Agent, or Firm* — Dinsmore & Shohl LLP (57) ABSTRACT

The present disclosure generally relates to methods and apparatuses for additive manufacturing using foil-based build materials. Such methods and apparatuses eliminate several drawbacks of conventional powder-based methods, including powder handling, recoater jams, and health risks. In addition, the present disclosure provides methods and apparatuses for compensation of in-process warping of build plates and foil-based build materials.

11 Claims, 7 Drawing Sheets

(56) References Cited

U.S. PATENT DOCUMENTS

| | | |
|---|---|---|
| 5,071,503 A | 12/1991 | Berman |
| 5,126,529 A | 6/1992 | Weiss et al. |
| 5,183,598 A | 2/1993 | Helle et al. |
| 5,398,193 A | 3/1995 | Deangelis |
| 5,432,704 A | 7/1995 | Vouzelaud et al. |
| 5,607,540 A | 3/1997 | Onishi |
| 5,730,817 A | 3/1998 | Feygin et al. |
| 5,957,006 A | 9/1999 | Smith |
| 6,056,843 A | 5/2000 | Morita et al. |
| 6,146,487 A | 11/2000 | Lee et al. |
| 6,441,338 B1 | 8/2002 | Rabinovich |
| 6,702,918 B2 | 3/2004 | Yang et al. |
| 6,799,619 B2 | 10/2004 | Holmes et al. |
| 6,909,929 B2 | 6/2005 | Farnworth et al. |
| 6,925,346 B1 | 8/2005 | Mazumder et al. |
| 6,966,968 B2 | 11/2005 | Chen et al. |
| 6,974,930 B2 * | 12/2005 | Jense ................ B23K 26/0846 219/121.8 |
| 7,275,925 B2 | 10/2007 | Farnworth |
| 7,402,219 B2 | 7/2008 | Graf |
| 7,511,248 B2 | 3/2009 | Franchet et al. |
| 8,003,039 B2 * | 8/2011 | Sperry ................ B33Y 10/00 264/401 |
| 8,359,744 B2 | 1/2013 | Hislop et al. |
| 8,488,197 B2 | 7/2013 | Abeloe |
| 8,524,020 B2 | 9/2013 | Lindgren et al. |
| 8,540,501 B2 | 9/2013 | Yasukochi |
| 8,822,875 B2 | 9/2014 | Webster et al. |
| 8,875,767 B2 | 11/2014 | Schmid et al. |
| 8,977,378 B2 | 3/2015 | Weinberg et al. |
| 9,468,960 B2 * | 10/2016 | Wilson ................ B22F 3/20 |
| 9,473,760 B2 | 10/2016 | Buser et al. |
| 9,514,397 B2 | 12/2016 | Peek |
| 9,522,426 B2 | 12/2016 | Das et al. |
| 9,597,730 B2 | 3/2017 | Mironets et al. |
| 2005/0173380 A1 * | 8/2005 | Carbone ................ B22F 3/1055 219/121.31 |
| 2011/0101569 A1 | 5/2011 | Yasukochi |
| 2015/0094837 A1 | 4/2015 | Cohen et al. |
| 2015/0251351 A1 | 9/2015 | Feygin |
| 2015/0293722 A1 | 10/2015 | Cudak et al. |
| 2016/0046082 A1 | 2/2016 | Fuerstenberg |
| 2016/0129528 A1 | 5/2016 | Hyatt et al. |
| 2016/0193688 A1 | 7/2016 | Kironn et al. |
| 2016/0243764 A1 | 8/2016 | Hays et al. |
| 2016/0271870 A1 | 9/2016 | Brown, Jr. |
| 2017/0045877 A1 | 2/2017 | Shapiro et al. |
| 2017/0050382 A1 | 2/2017 | Minardi et al. |
| 2017/0057181 A1 | 3/2017 | Waldrop, III et al. |

FOREIGN PATENT DOCUMENTS

| | | | |
|---|---|---|---|
| WO | 2015/020954 A1 | 2/2015 | |
| WO | 2015/105762 A1 | 7/2015 | |
| WO | WO 2015/200839 A1 | 12/2015 | |
| WO | 2017/009368 A1 | 1/2017 | |
| WO | WO-2017065751 A1 * | 4/2017 | ................ B22F 3/24 |

* cited by examiner

PRIOR ART

FIXED BED LARGE SCALE ADDITIVE MANUFACTURING USING FOIL-BASED BUILD MATERIALS

INTRODUCTION

The present disclosure generally relates to methods and apparatuses for additive manufacturing using foil-based build materials. More specifically, the disclosure relates to providing a layer of foil to a build area.

BACKGROUND

Additive manufacturing (AM) or additive printing processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses electromagnetic radiation such as a laser beam, to melt or sinter a powdered material, creating a solid three-dimensional object.

Figure 1:
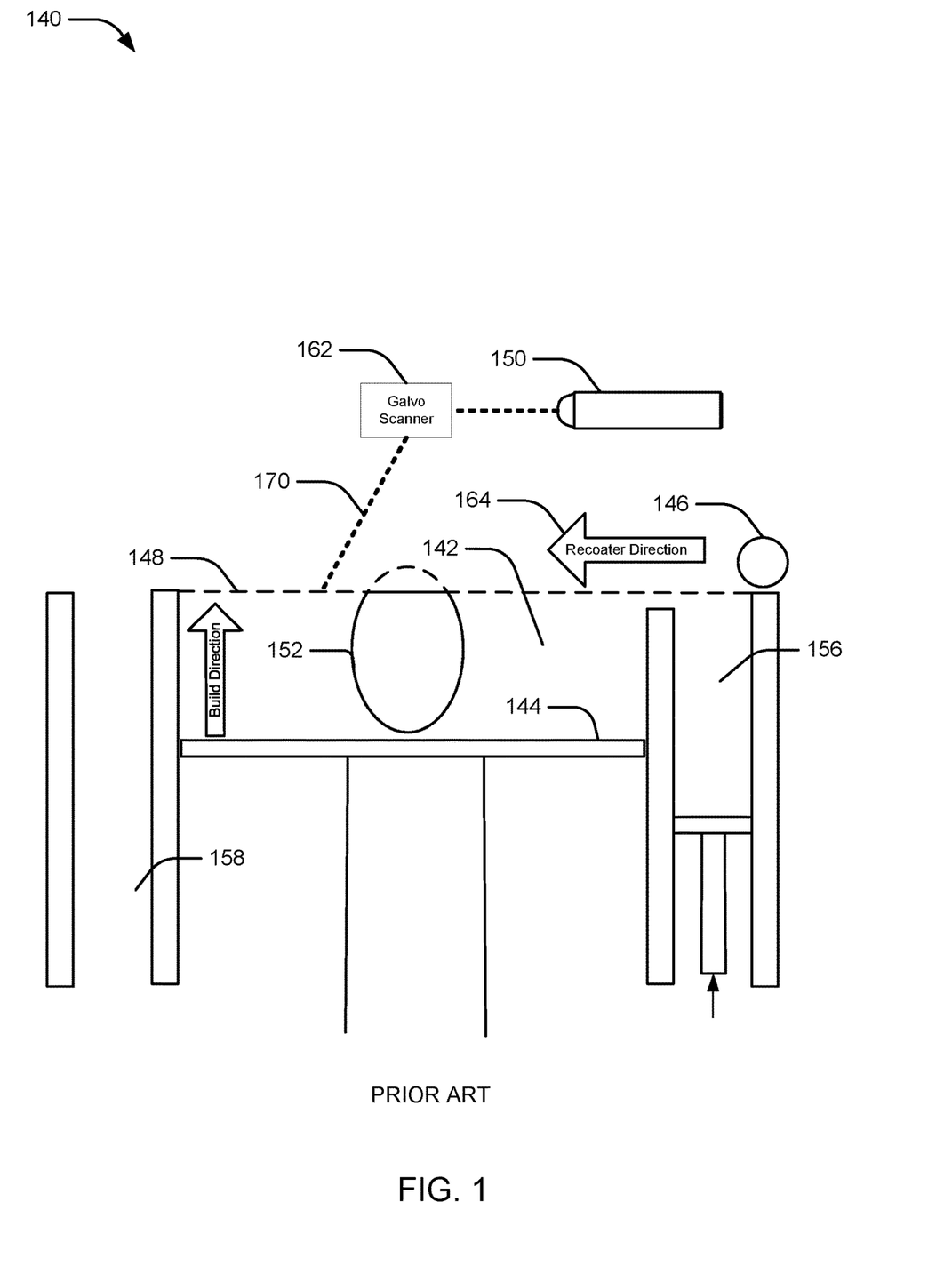
FIG. 1 shows an example of an apparatus for AM according to conventional methods.

An example of an apparatus for AM using a powdered build material is shown in FIG. 1. The apparatus 140 builds objects or portions of objects, for example, the object 152, in a layer-by-layer manner by sintering or melting a powder material (not shown) using an energy beam 170 generated by a source 150, which can be, for example, a laser for producing a laser beam, or a filament that emits electrons when a current flows through it. The powder to be melted by the energy beam is supplied by reservoir 156 and spread evenly over a powder bed 142 using a recoater arm 146 travelling in direction 164 to maintain the powder at a level 148 and remove excess powder material extending above the powder level 148 to waste container 158. The energy beam 170 sinters or melts a cross sectional layer of the object being built under control of an irradiation emission directing device, such as a laser galvo scanner 162. The galvo scanner 162 may comprise, for example, a plurality of movable mirrors or scanning lenses. The speed at which the energy beam is scanned is a critical controllable process parameter, impacting the quantity of energy delivered to a particular spot. Typical energy beam scan speeds are on the order of 10 to several thousand millimeters per second. The build platform 144 is lowered and another layer of powder is spread over the powder bed and object being built, followed by successive melting/sintering of the powder by the laser 150. The powder layer is typically, for example, 10 to 100 microns in thickness. The process is repeated until the object 152 is completely built up from the melted/sintered powder material. The energy beam 170 may be controlled by a computer system including a processor and a memory (not shown). The computer system may determine a scan pattern for each layer and control energy beam 170 to irradiate the powder material according to the scan pattern. After fabrication of the object 152 is complete, various post-processing procedures may be applied to the object 152. Post-processing procedures include removal of excess powder by, for example, blowing or vacuuming. Other post processing procedures include a stress relief heat treat process. Additionally, thermal and chemical post processing procedures can be used to finish the object 152.

Most commercial AM machines allow components to be built in a layer-by-layer manner using powdered build material, which has several drawbacks. Generally, loose powder materials may be selectively difficult to store and transport. There may also be health risks associated with inhalation of loose powders. Additional equipment for isolating the powder environment and air filtration may be necessary to reduce these health risks. Moreover, in some situations, loose powder may become flammable.

In view of the foregoing, non-powder-based methods and apparatuses are desirable.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

In one aspect, the present disclosure is directed to an apparatus for additive manufacturing of an object, the apparatus comprising: a sealed build environment; a vertically movable build plate having a build face within the build environment; a foil delivery unit positioned above the build face and configured to extend foil above the build face, and a radiation emission directing device configured to direct radiation onto the extended foil, wherein the build plate is configured to move the build face or the object thereon into contact with the extended foil from the delivery unit, so that the foil may be irradiated and incorporated into the object. In some aspects, the apparatus further comprises a cartridge loader connected to the foil delivery unit to receive a sealed cartridge and open the sealed cartridge within the build environment. In some aspects, the build plate is configured to move the build face or object thereon into contact with the extended foil from the foil delivery unit, so that the foil may be irradiated and incorporated into the object; and move the build face or object thereon out of contact with one or more unmelted areas of the foil, so that the one or more unmelted areas of the foil may be advanced away from the build plate or object thereon. In some aspects, the radiation emission directing device comprises an energy source. In some aspects, the apparatus further comprises a galvo scanner. In some aspects, the energy source is a laser source. In some aspects, the energy source is an electron beam source. In some aspects, the foil delivery unit comprises a foil dispenser capable of storing one or more rolls of foil and dispensing a length of foil from an active roll of foil. In some aspects, the apparatus further comprises an excess collection roll. In some aspects, the foil delivery unit comprises a sheet dispenser capable of storing one or more sheets of foil and dispensing one sheet at a time. In some aspects, the apparatus further comprises a discard bin. In some aspects, the apparatus further comprises one or more detectors configured to inspect one or more of the foil, the object, and radiation emitted or received by the radiation emission directing device.

In another aspect, the present disclosure is directed to a method comprising: positioning a build plate having a face with respect to a build unit, the face comprising a work surface; dispensing a layer of metal foil over the face of the build plate; repositioning the build plate to bring the face of the build plate into contact with the foil; melting selected areas of the respective layer of metal foil to the work surface on the face of the build plate; and removing unmelted areas of the respective layer of metal foil. In some aspects, the melting selected areas of the respective layer of metal foil to the work surface comprises irradiating the selected areas with an energy source. In some aspects, the energy source is a laser source. In some aspects, the energy source is an electron beam source. In some aspects, the energy source is modulated by a galvo scanner. In some aspects, the dispensing by the build unit a layer of metal foil comprises dispensing a length of foil from a continuous roll of metal foil to extend a sheet of metal foil over the face of the build plate. In some aspects, the removing unmelted areas of the respective layer of metal foil comprises winding unmelted areas of the sheet of metal foil onto an excess collection roll. In some aspects, the dispensing by the build unit a layer of metal foil comprises dispensing a sheet of foil from a sheet dispenser. In some aspects, the removing the unmelted areas of the respective layer of metal foil comprises advancing the unmelted areas of foil away from the object or work surface to a discard bin. In some aspects, the repositioning comprises moving the build plate toward the foil. In some aspects, the repositioning comprises moving the build plate toward the foil. In some aspects, the method further comprises receiving a representation of a layer to be formed by fusing one or more regions of the layer of metal foil to the work surface; determining that at least a first region of the one or more regions defines an unfused opening isolated from the unmelted portions of the respective layer of metal foil; dividing the first region into at least two scan areas, wherein a fragment of the unfused opening adjacent each scan area is connected to the unmelted portions of the respective layer of metal foil; fusing a first scan area of the at least two scan areas to the work surface; moving the layer of metal foil; and fusing a second scan area of the at least two scan areas to the work surface.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present application is directed to methods and apparatuses for fixed bed large scale additive manufacturing using foil-based build materials. According to the present disclosure, additive manufacturing is carried out on a face of a build plate, using foil-based build materials. Thin metallic sheets or foil are extended between rollers or in a feed plane across the region where a part will be made. A build bed or build plate may then be raised beneath the sheet to ensure physical contact between the part (or the build plate) and the sheet. Using a sheet of a thin "foil" metal held or placed above a region of interest allows the apparatus to incident the opposite side of the foil with a radiation source and weld the foil immediately under the irradiation point to the surface below. After welding, the build bed or plate may be lowered, the foil may be advanced or replaced, and the process may be repeated. Such technology may be used to create similar objects as a conventional powder bed printer. However, the methods of the present disclosure have such advantages as no powder handling, no recoat or recoat time, and no recoater jams.

As used herein, a "foil-based build material" is a continuous, uniform, solid, thin sheet of metal, conventionally prepared by hammering or rolling. In some aspects of the present disclosure, foil-based build materials do not comprise a backing or carrier. Foils suitable for use with the present disclosure may be used in the form of rolls of foil, which may or may not be pre-perforated, or in the form of pre-cut sheets of foil. Foil-based build materials suitable for use with the present disclosure include, but are not limited to, aluminum, cobalt-chrome, HS188, maraging steel, stainless steels, tooling steel, nickel, titanium, copper, tin, cobalt, niobium, tantalum, gamma titanium aluminide, Inconel 625, Inconel 718, Inconel 188, Haynes 188®, Haynes 625®, Super Alloy Inconel 625™, Chronin® 625, Altemp® 625, Nickelvac® 625, Nicrofer® 6020, Inconel 188, and any other material having material properties attractive for the formation of components using the abovementioned techniques.

As used herein, "radiation" refers to energy in the form of waves or particles, including, but not limited to, heat, radio waves, visible light, x-rays, radioactivity, acoustic radiation, and gravitational radiation.

As used herein, to "modulate" an energy beam from an energy source includes one or more of adjusting an angle of the beam and adjusting a focus of the beam. Suitable radiation emission directing devices for use according to the present disclosure include, but are not limited to, galvo scanners and deflecting coils. In some aspects, a radiation emission directing device may modulate an energy beam from an energy source by bending and/or reflecting the energy beam to scan different regions on a build face.

FIGS. 2A-2D show schematic diagrams of an apparatus according to a first embodiment of the present disclosure.

Figure 2A:
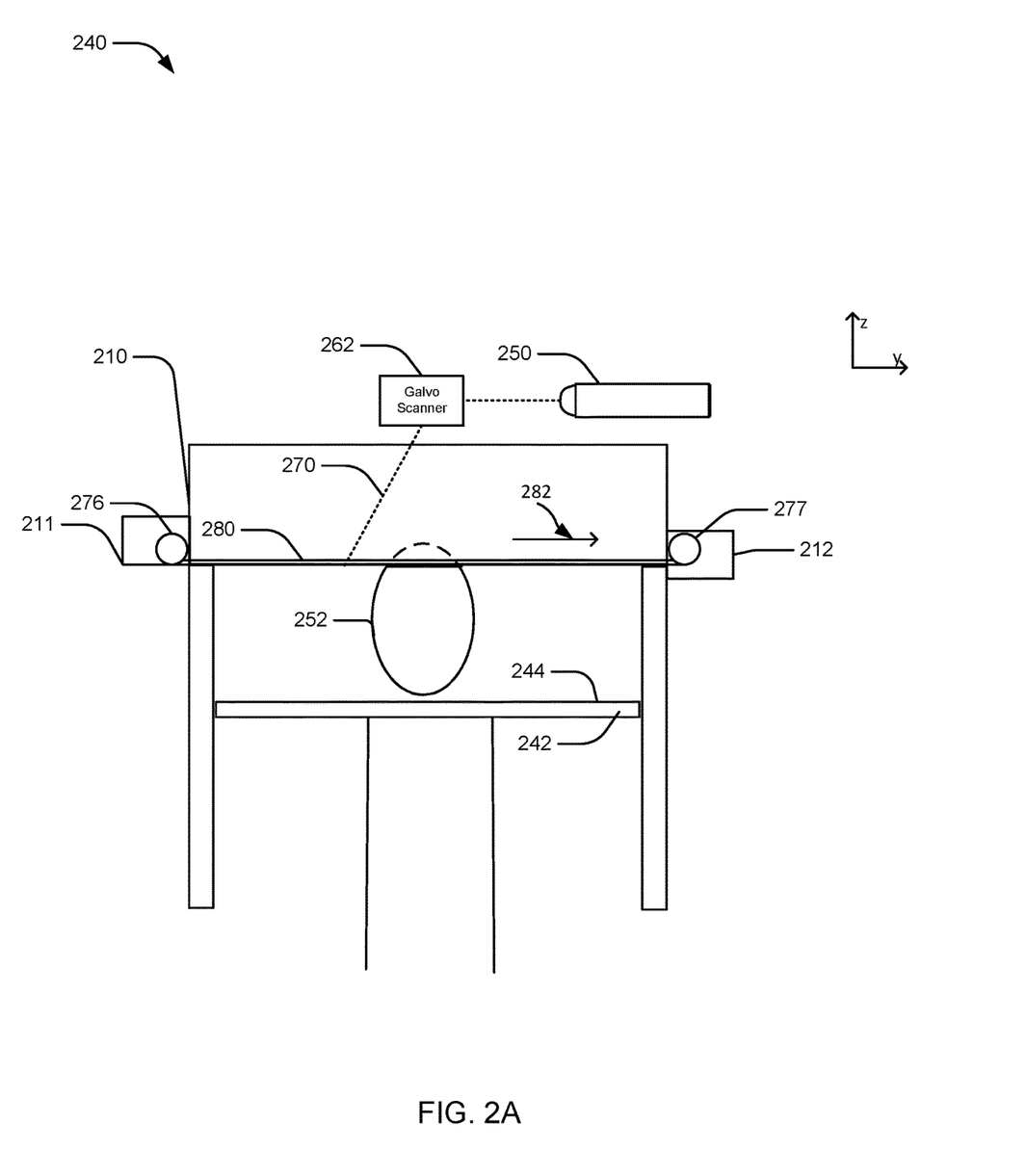
FIG. 2A shows a schematic diagram of an apparatus for AM according to a first embodiment of the present disclosure.

Apparatus 240 comprises a build plate 242 with a face 244, which is available for building an object by additive manufacturing (FIG. 2A). In some aspects, the build plate 242 runs in the xy-plane with respect to face 244, with building occurring in the z-direction relative to face 244.

A foil delivery unit comprising foil supply 276 and foil collector 277, is used to build an object 252 using foil 278. The foil delivery unit extends foil from the foil supply 276, parallel to the build plate face 244, to the foil collector 277. When a layer is completed, the foil delivery unit advances the foil in the y-direction 282 to provide fresh foil above the build plate face 244. In an aspect, the foil delivery unit is configured to move in the x-dimension. Accordingly, objects having a width greater than the width of a sheet of foil may be built. Further, the foil may be shifted in the x-dimension to maximize usage of the foil, for example, by scanning multiple layers of a thin structure without advancing the foil in the y-direction 282.

Foil supply 276 may be introduced to apparatus 240 via airlock 211. Foil collector 277 may be housed in an airlock 212. In some aspects, build plate 242, airlocks 211 and 212, and the build area are contained within a sealed build environment 210. The airlocks 211 and 212 allow foil cartridges to be inserted and removed from the sealed build environment 210. The foil within the cartridges may be protected from environmental effects (e.g., oxidation) outside of the sealed build environment 210. The airlocks 211 and 212 prevent contamination of the sealed build environment 210 when resupplying the foil delivery unit using cartridges.

In some aspects, energy source 250 is a laser source. In other aspects, energy source 250 is an electron beam source. In such aspects, the apparatus 240 is operated under vacuum conditions. The energy source 250 may be a laser source under either vacuum or non-vacuum conditions. In some aspects, a radiation emission directing device, such as a galvo scanner 262, may be used to modulate energy beam 270 from energy source 250.

In a first embodiment, foil supply 276 supplies a continuous roll of a build material in the form of a foil.

Figure 2B:
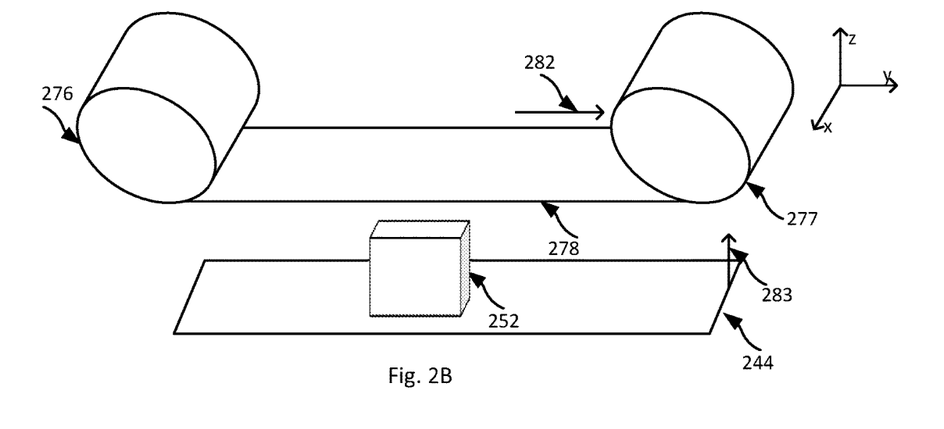
FIG. 2B shows a schematic diagram of supplying a length of fresh build material according to a first embodiment of the present disclosure.
Figure 2C:
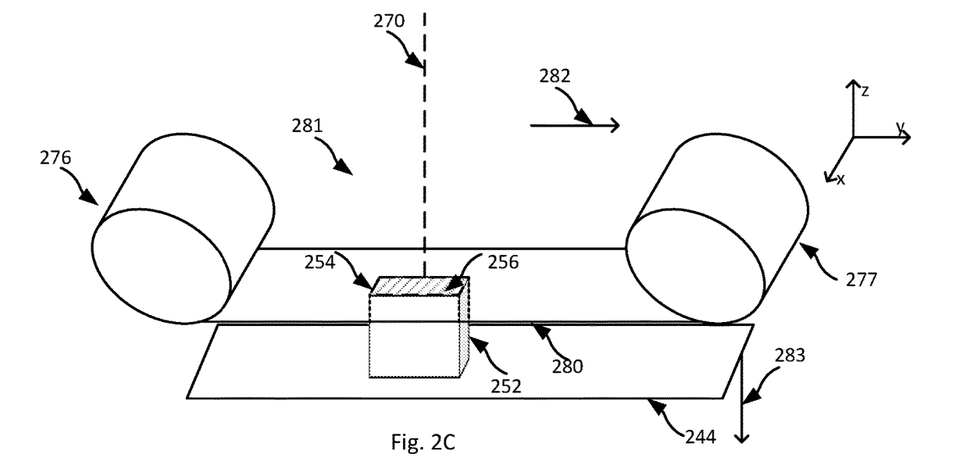
FIG. 2C shows a schematic diagram of cutting and irradiating a portion of build material in the preparation of a new layer according to a first embodiment of the present disclosure.
Figure 2D:
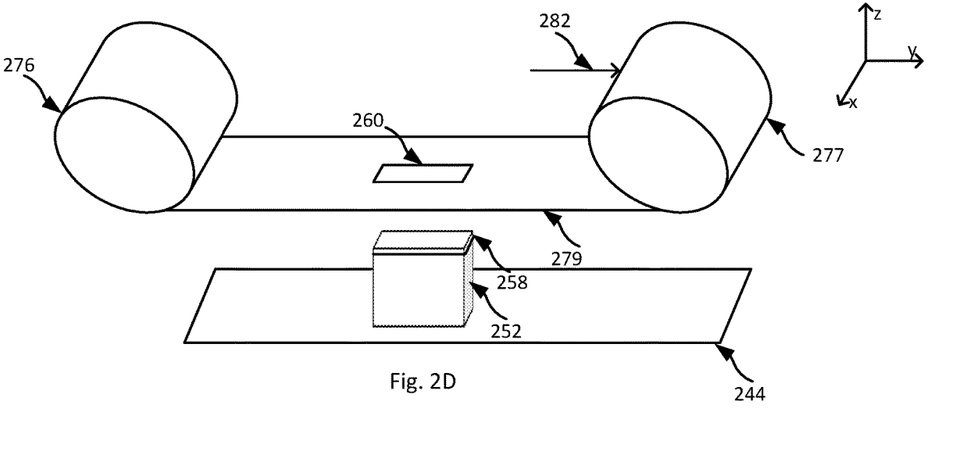
FIG. 2D shows a schematic diagram of the apparatus after fusing of the new layer to the object according to a first embodiment of the present disclosure.

FIGS. 2B-2D represent steps of a method of additive manufacturing according to a first embodiment of the present disclosure. In some aspects, the foil delivery unit contains a foil supply roll 276 and a collection roll 277. Supply roll 276 supplies a length of fresh foil 278, which extends over a build plate face 244, upon which object 252 is built, in direction 282 towards collection roll 277 (FIGS. 2A-2B).

In some aspects, supply roll 276 is supplied as a cartridge to be installed in the airlock 211. In such aspects, the cartridge may supply foil manually or automatically after cartridge insertion. In such aspects, after all of the materials from the cartridge are expended, the cartridge can be removed or deposited off, and a fresh cartridge can be inserted (manually) or picked up (automatically), allowing the build process to continue.

Extended foil 278 is brought into contact with build plate face 244 (or object 252) by vertical movement of build plate 244 in direction 283 toward extended foil 278.

Energy beam 270 is then used to cut active foil 280 (FIG. 2C) in order to produce an additional layer 258 (FIG. 2D). As used herein, "cutting" the active foil according to the present disclosure refers to detaching the additional layer 258 (or the portion of active foil 280 that will become additional layer 258) from the bulk of active foil 280. The cutting is preferably performed by energy beam 270. In some aspects, layer 258 may be the initial layer in the manufacture of object 252. In some aspects, layer 258 may be the final layer in the manufacture of object 252. In some aspects, layer 258 may be an intermediate layer in the manufacture of object 252.

In some aspects, energy beam 270 first irradiates along a perimeter 254 of the layer 258 to be added in order to fuse active foil 280 to object 252 at perimeter 254 (FIG. 2C). In some aspects, the irradiation simultaneously cuts through active foil 280. In other aspects, energy beam 270 cuts active foil 280 along perimeter 254 prior to irradiation along 254 to fuse 254 to object 252. In other aspects, energy beam 270 irradiates along perimeter 254 in order to fuse active foil 280 to object 252 at perimeter 254, and then energy beam 270 cuts active foil 280 along perimeter 254.

In some aspects, after cutting and irradiation (simultaneously or sequentially in either order) along perimeter 254, energy beam 270 irradiates area 256 in a raster-fill manner, to fuse active foil 280 to the object 252.

In other aspects, energy beam 270 first irradiates area 256 in a raster-fill manner, to fuse active foil 280 to the object 252, and then cuts and irradiates along perimeter 254 of the layer added. In such aspects, the cutting and irradiation along perimeter 254 may occur simultaneously or sequentially in either order.

Suitable settings for energy beam 270, energy source 250, and/or the radiation emission directing device (illustrated as, e.g., galvo scanner 262) for cutting active foil 280 and for irradiating active foil 280 either along perimeter 254 or in area 256 are known or can be determined by those of ordinary skill in the art.

Completion of laser cutting and irradiation along perimeter 254 creates a hole 260 in the active foil 280, wherefrom a new layer was added to object 252. After the energy beam 270 irradiates the active foil 280, the unmelted portion of the active foil 280 may be referred to as a remaining portion 279 (FIG. 2D). The remaining portion 279 may include any unmelted portions that are not added to object 252. In an aspect, the remaining portion 279 may be contiguous. That is, each of the unmelted portions may be connected, which may facilitate removal of the remaining portion 279. In some aspects, build plate face 244 is moved in the z-direction to enhance separation of remaining portion 279 from object 252. Remaining portion 279 may then be advanced in direction 282 onto collection roll 277, to provide a fresh length of foil 278 to build the next layer. In some aspects, build plate face 244 is moved in direction 283 prior to building the next layer. In some such aspects, build plate 244 is moved in direction 283 by a distance equal to the thickness of the metal foil 278. In some aspects, no further layers are built. In some aspects, one or more further layers are built.

Figure 2E:
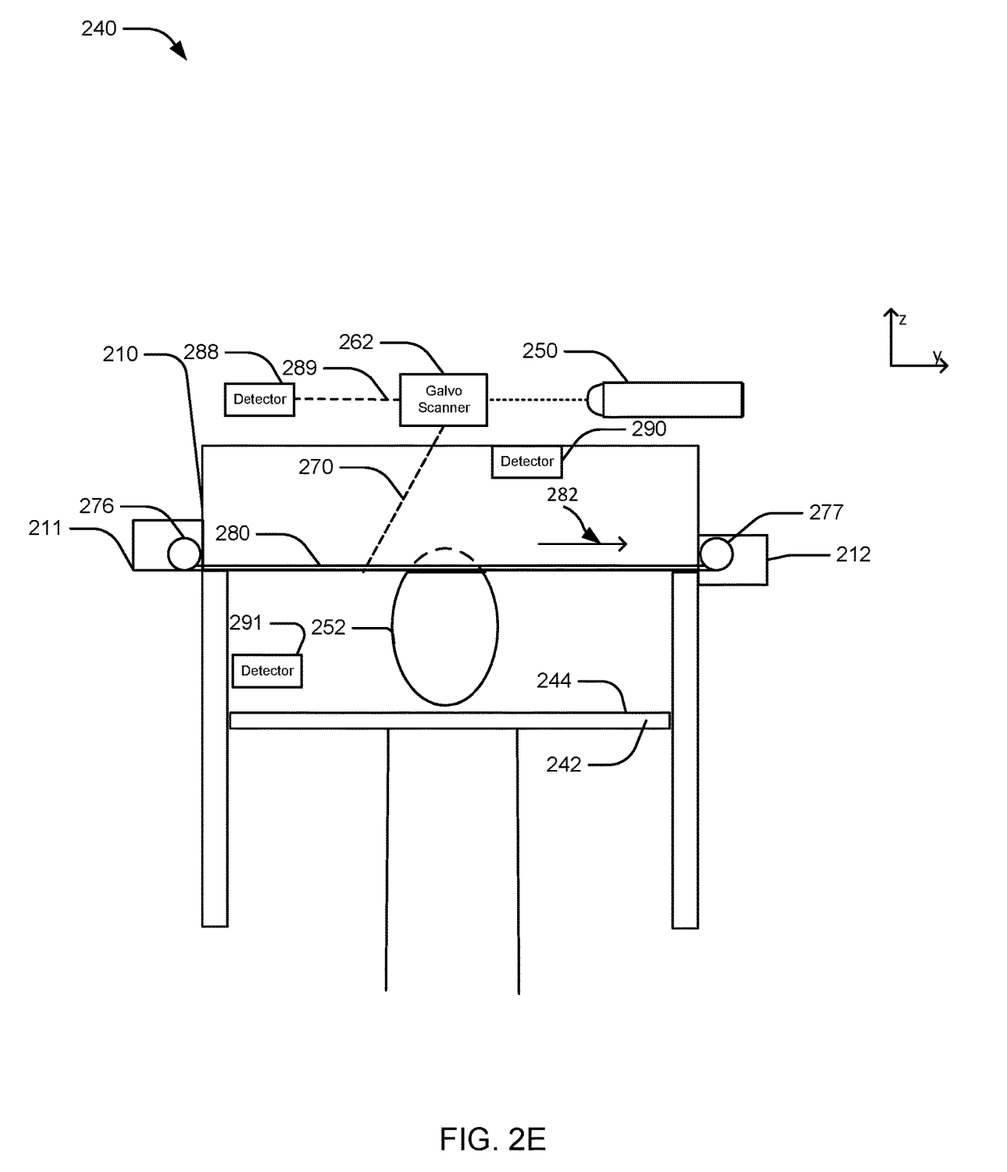
FIG. 2E shows a schematic diagram of an apparatus for AM with process monitoring according to a first embodiment of the present disclosure.

In some aspects, apparatus 240 may further comprise one or more detectors for process monitoring (FIG. 2E). The build process depicted in FIGS. 2B-2D reflects return radiation beam 289, which travels back to the galvo scanner 262 and then to photodetector 288, which analyzes return radiation beam 289 for properties such as, but not limited to. In addition, apparatus 240 may further comprise detectors 290, 291 to inspect the foil and the object 252, respectively. Inspection by detector 290 of the foil may include inspection of one or more of the foil supply 276, collection roll 277, fresh foil 278, active foil 280, and remaining portion 279. Detector 291 may be located below a current build layer. That is, at least once the object 252 reaches a threshold size in the z-dimension, the detector 291 extends in the z-dimension less than the size of the object 252 in the z-dimension. This position allows the detector 291 to directly observe the object 252. Additionally, such a perspective may not be available in a powder based apparatus because unfused powder would prevent direct observation of the object 252. The detector 291 may provide feedback regarding finished portions of the object 252 before the entire object 252 has been completed. Detectors 290, 291 may be each independently be any suitable detector, such as, but not limited to a camera or a thermal scanner. In an aspect, the detector 291 may be an electromagnetic detector. The detector 291 may apply an electric current to the object 252. The detector 291 may observe eddy currents within the object 252. The eddy currents may indicate gaps or fractures within the object 252 that alter an expected pattern. Accordingly, defects may be detected at an early stage of the build process.

In some aspects, detectors 288, 290, and 291 transmit data to a controller, which may be a computer. In some aspects, the method may include adjusting the build process in response to the data. Suitable adjustments can be determined by those of ordinary skill in the art based on the data and on knowledge of the desired object 252 to be built. Suitable adjustments may include, but are not limited to, adjusting one or more of the frequency or intensity of energy beam 270; repositioning one or more of the supply roll 276, excess collection roll 277, and detectors 288, 290, or 291. Adjustments may be made by a controller, such as a computer, either automatically or manually.

Figure 3:
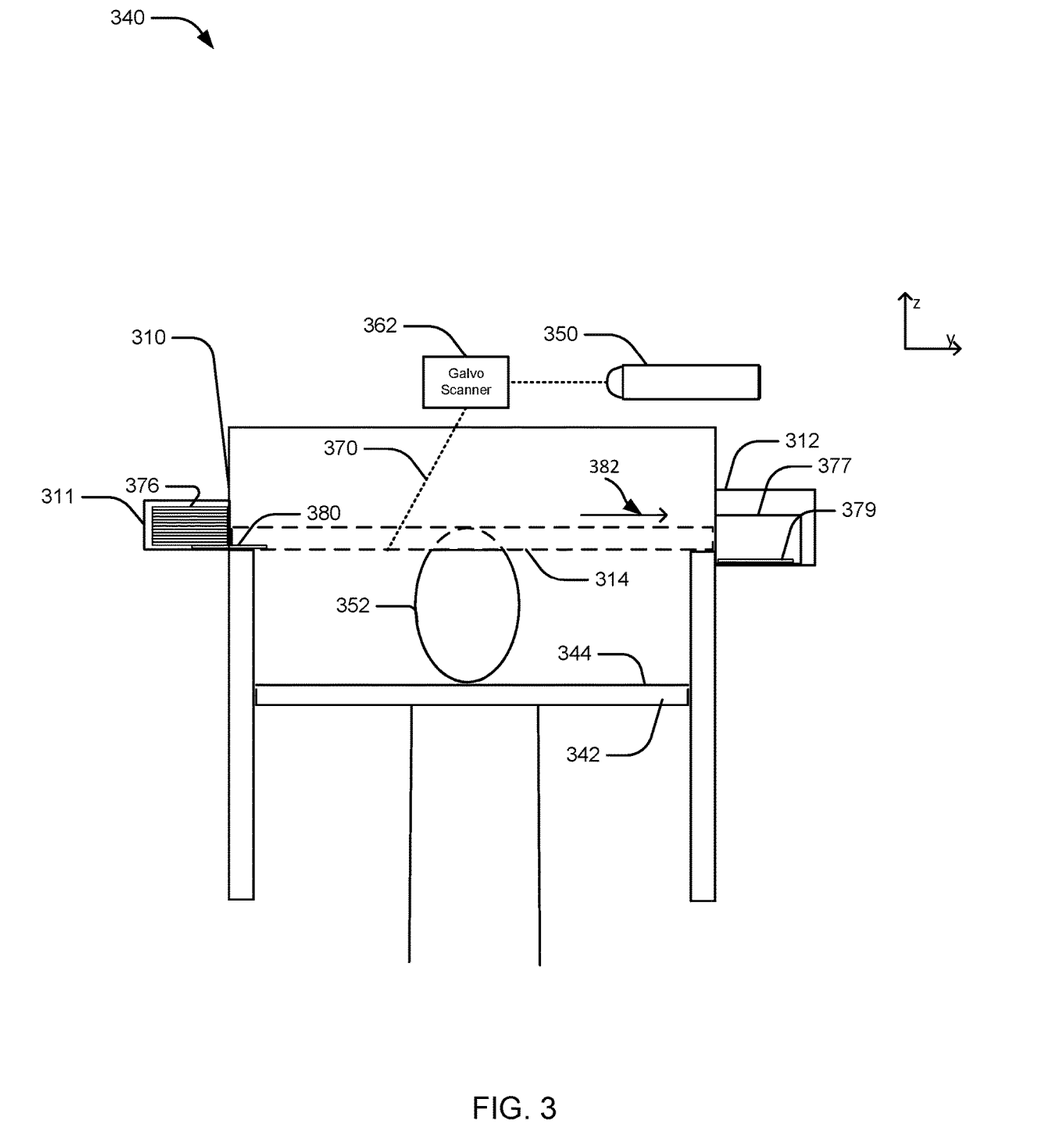
FIG. 3 shows a schematic diagram of an apparatus for AM according to a second embodiment of the present disclosure.

FIG. 3 shows a schematic diagram of an apparatus according to a second embodiment of the present disclosure.

Apparatus 340 comprises a build plate 342 with face 344, which is available for building an object by additive manufacturing (FIG. 3A). In some aspects, the build plate 342 runs in the xy-plane with respect to face 344, with building occurring in the z-direction relative to face 344.

A foil delivery unit comprising foil supply 376 and foil collector 377, is used to build an object 352 using foil 380. The foil delivery unit transfers foil from the foil supply 376, to the build plate face 344, via a conveyor mechanism 314, and eventually to the foil collector 377. When a layer is completed, the foil delivery unit advances the foil in the y-direction 382 via conveyor mechanism 314 to the foil collector 377, and foil supply 376 dispenses a fresh foil 380. In an aspect, the foil delivery unit is configured to move in the x-direction. Accordingly, objects having a width greater than the width of a sheet of foil may be built. Further, the foil may be shifted in the x-dimension to maximize usage of the foil, for example, by scanning multiple layers of a thin structure without advancing the foil in the y-direction 382.

Foil supply 376 may be introduced to apparatus 340 via an airlock 311. Foil collector 377 may be similarly housed in an airlock 312. In some aspects, build plate 342, airlocks 311 and 312, and the build area are contained within a sealed build environment 310. The airlocks 311 and 312 allow foil cartridges to be inserted and removed from the sealed build environment 310. The foil within the cartridges may be protected from environmental effects (e.g., oxidation) outside of sealed build environment 310. The airlocks 311 and 312 prevent contamination of the sealed build environment 310 when resupplying the foil delivery unit using cartridges.

In some aspects, energy source 350 is a laser source. In other aspects, energy source 350 is an electron beam source. In such aspects, the apparatus 340 is operated under vacuum conditions. The energy source 350 may be a laser source under either vacuum or non-vacuum conditions. In some aspects, a radiation emission directing device, such as galvo scanner 362, may be used to modulate energy beam 370 from energy source 350.

In the second embodiment, foil supply 376 supplies pre-cut sheets of foil 380. Building an object according to the second embodiment may be similar in some aspects to building an object according to the first embodiment. Instead of advancing foil from a roll, however, the apparatus 340 may extend a new pre-cut sheet for a layer or portion thereof.

In some aspects, apparatus 340 may further comprise one or more detectors for process monitoring. Detectors and process monitoring according to the second embodiment may be similar in some aspects to detectors and process monitoring according to the first embodiment.

Figure 4:
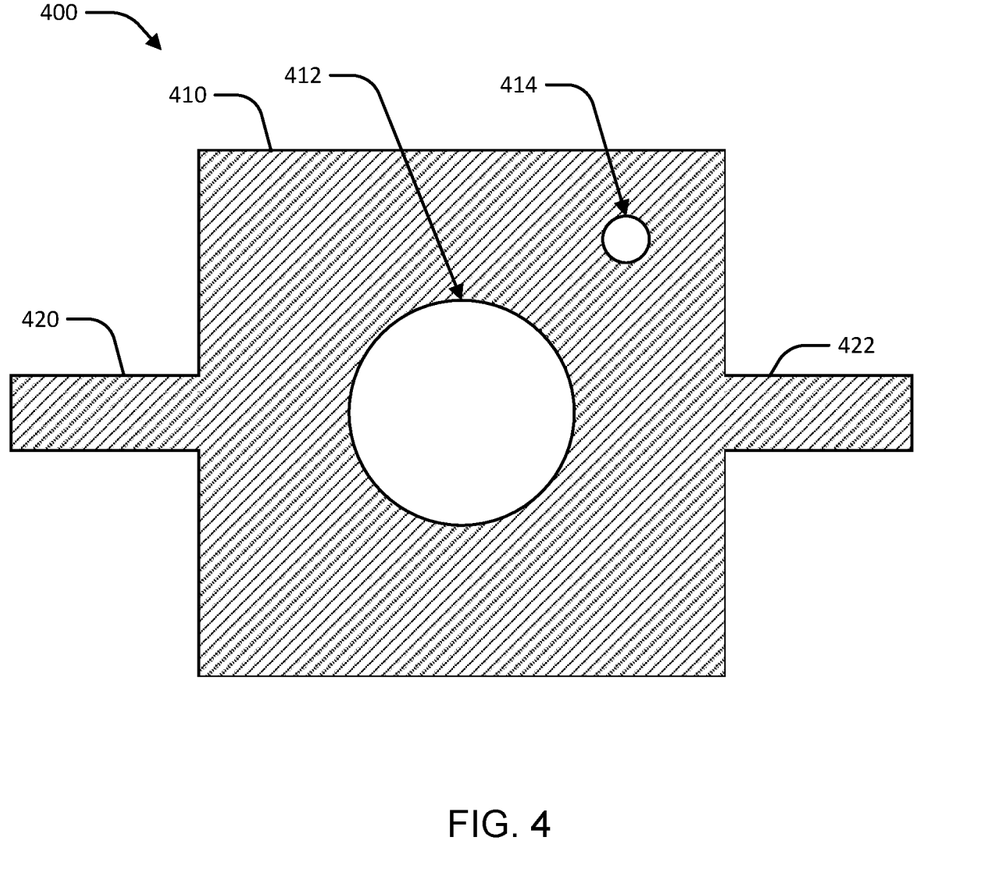
FIG. 4 shows a schematic diagram of an example layer to be added to an object using any of the apparatuses of the present disclosure.

FIG. 4 illustrates an example of a cross-sectional layer 400 of an object (e.g., object 252) in an xy-plane. A controller 401 may slice the object 252 into multiple such layers arranged in the z-dimension. Then the apparatus 240 builds the object 252 by scanning the layer 400 in the area 256 of the active foil 280 to fuse the area 256 to the build plate face 244 of previously build portions of the object 252.

In the illustrated example, the layer 400 includes a main portion 410 and side portions 420, 422. The main portion 410 includes a relatively large opening 412 and a relatively small opening 414. In a foil-based apparatus such as the apparatus 240, an opening 412, 414 within a layer 400 may pose a problem. When the layer 400 is scanned, an area defined by the perimeter 254 is detached from the active foil 280, which becomes the remaining portion 279. When the entire area 256 is scanned, the detached area becomes part of the object 252. When the layer 400 includes an opening 412, 414, however, the foil within the opening becomes detached from both the remaining portion 279 and the rest of the layer 400. For some objects, the detached foil may be removed upon build completion. However, it is also possible that the detached foil corresponding to the opening 412 may move during a build operation and interfere with the build operation. Additionally, for objects that form an enclosed hollow volume, the detached foil may become trapped within the object. The present disclosure provides techniques to avoid creation of detached foil portions.

In an aspect, a relatively small opening (e.g., opening 414) may be formed by ablating the foil. For example, the power of the energy source 250 may be set to a level that causes the foil to disintegrate rather than fuse with an underlying object. In an aspect, the opening 414 may be formed when the active foil 280 is not in contact with the object 252 such that the ablation does not damage the object 252. In an aspect, the size of an opening created by ablation is limited depending on the build material, shape of the opening, and power of the energy source 250. Accordingly, ablation may be used when the size and shape of the opening 414 are less than threshold parameters.

Figure 5:
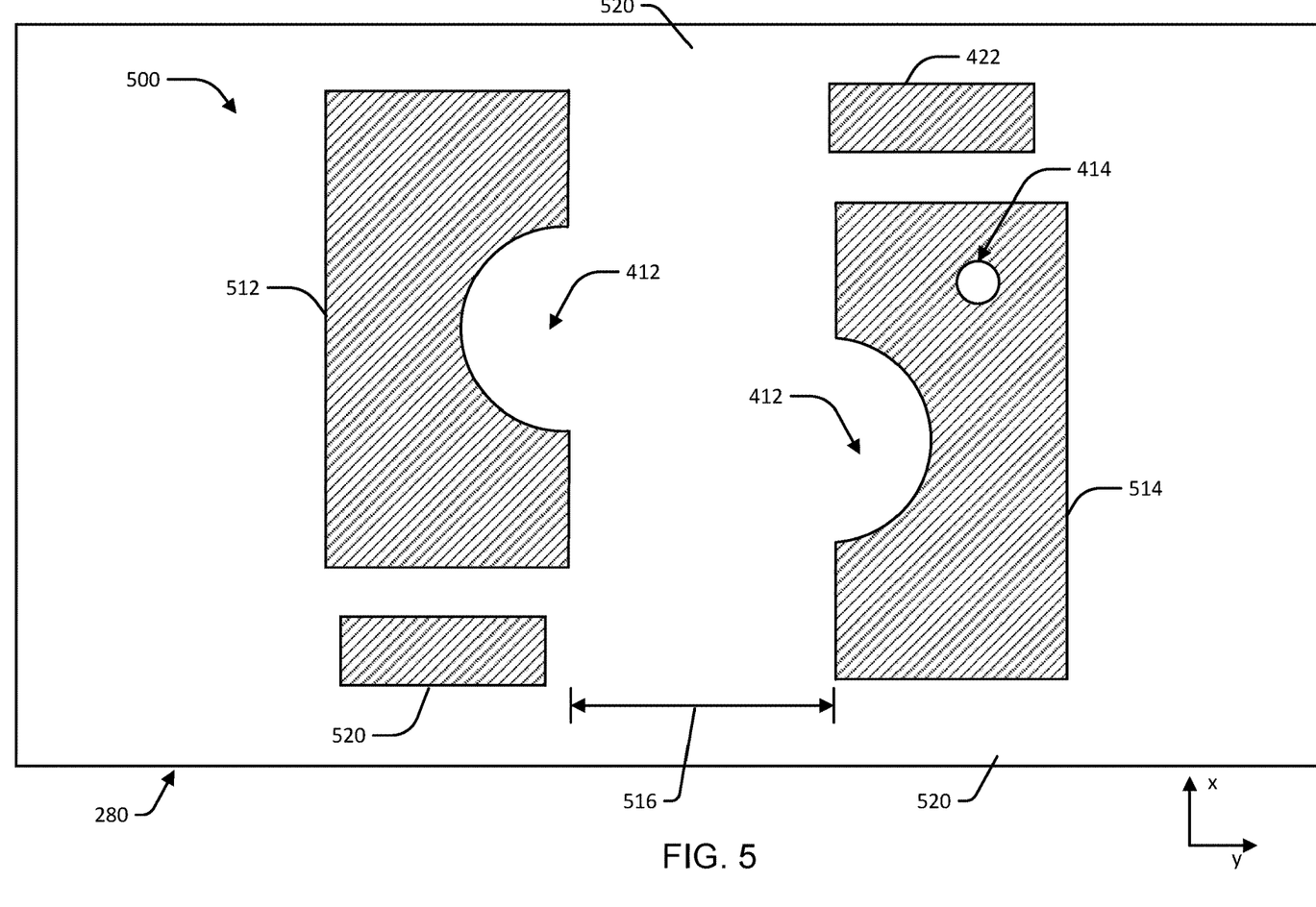
FIG. 5 shows a schematic diagram of the example layer of FIG. 4 rearranged according to an aspect of the present disclosure.

FIG. 5 is a diagram showing the layer 400 of FIG. 4 rearranged as the layer 500 without relatively large openings. The layer 500 can be scanned from the active foil 280 without creating detached foil corresponding to the opening 412. The main portion 410 is divided into a left portion 512 and a right portion 514 separated by a space 516. The space 516 connects to edge 520 of the active foil 280. The edges of the opening 412 are divided between the left portion 512 and right portion 514. Accordingly, the foil within the opening is also connected to the space 516. The side portion 420, 422 are also separated from left portion 512 and right portion 514 to reduce the total length of foil for the layer.

The relatively small opening 414 may remain within the right portion 514 and may be formed by ablation as discussed above.

When scanning the layer 500, the apparatus 240 moves the build unit 275 and/or the active foil 280 in one or more dimensions relative to the build plate face 244 and/or object 252. For example, the apparatus 240 first scans the right portion 514 in a correct position relative to the build plate face 244 to add the right portion 514 to the object 252.

The right portion 514 may be cut from the active foil 280 by the scanning so that the active foil 280 may be moved relative to the right portion 514. For example, the apparatus 240 may move the active foil 280 in the z-dimension away from the right portion 514. The apparatus 240 then advances the active foil 280, or moves the build unit 275, in the y-dimension a distance corresponding to the space 516 and also moves the build unit 275 in the x-dimension to bring the left portion 512 into alignment with the right portion 514. The build unit 275 may then move the active foil 280 in the z-dimension to restore contact between the active foil 280 and the object 252. The build unit 275 then scans the left portion 512 to fuse the left portion 512 to the object 252. The apparatus 240 may follow a similar sequence of positioning the build unit 275 and/or active foil 280 to align the side portions 420, 422 in their respective locations relative to the main portion 410 formed by scanning left portion 512 and right portion 514.

Accordingly, multiple portions of a layer are sequentially scanned to form a complete layer of the object. Separating a layer of the object into the multiple portions prevents openings within the layer from forming isolated detached foil sections. Additionally, separating the layer into multiple portions may be used to rearrange portions of the object on the foil to more efficiently utilize the area of the foil. Further, portions of sequential layers may overlap on the foil (e.g, in the x-dimension) to provide further efficient use of foil.

While the present disclosure describes aspects of the invention using a fixed bed, various aspects may also be carried out using foil-based materials with a mobile build unit. Aspects of additive manufacturing using foil-based materials with a mobile build unit include those described in:

U.S. patent application Ser. No. 15/811,283, entitled "Mobile Large Scale Additive Manufacturing Using Foil-Based Build Materials," filed on Nov. 13, 2017;

U.S. patent application Ser. No. 15/811,196, entitled "Foil Part Warp Compensation For Mobile Large Scale Additive Manufacturing Using Foil-Based Build Materials," filed on Nov. 13, 2017;

U.S. patent application Ser. No. 15/811,400, entitled "Foil Part Vectorization For Mobile Large Scale Additive Manufacturing Using Foil-Based Build Materials," filed on Nov. 13, 2017; and U.S. patent application Ser. No. 15/811,313, entitled "Process Monitoring For Mobile Large Scale Additive Manufacturing Using Foil-Based Build Materials," filed on Nov. 13, 2017.

The disclosures of these applications are incorporated herein by reference in their entireties.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. An apparatus for additive manufacturing of an object, the apparatus comprising:
   a sealed build environment;
   a vertically movable build plate having a build face within the sealed build environment;
   a first airlock in selective communication with the sealed build environment;
   a second airlock in selective communication with the sealed build environment;
   a foil delivery unit positioned above the build face and configured to extend foil above the build face, the foil delivery unit comprising a foil supply positioned within the first airlock and a foil collector positioned in the second airlock, and
   a radiation emission directing device configured to direct radiation onto the extended foil,
   wherein the build plate is configured to move the build face or the object thereon into contact with the extended foil from the foil delivery unit, so that the foil is capable of being irradiated and incorporated into the object.

2. The apparatus of claim 1, wherein the build plate is configured to:
   move the build face or the object thereon out of contact with one or more unmelted areas of the foil, so that the one or more unmelted areas of the foil are capable of being advanced away from the build plate or the object thereon.

3. The apparatus of claim 1, wherein the radiation emission directing device comprises an energy source.

4. The apparatus of claim 3, further comprising a galvo scanner.

5. The apparatus of claim 3, wherein the energy source is a laser source.

6. The apparatus of claim 3, wherein the energy source is an electron beam source.

7. The apparatus of claim 1, wherein the foil supply comprises a foil dispenser capable of storing one or more rolls of foil and dispensing a length of foil from an active roll of foil.

8. The apparatus of claim 7, wherein the foil collector comprises an excess collection roll.

9. The apparatus of claim 1, wherein the foil supply comprises a sheet dispenser capable of storing one or more sheets of foil and dispensing one sheet at a time.

10. The apparatus of claim 9, wherein the foil collector comprises a discard bin.

11. The apparatus of claim 1, further comprising one or more detectors configured to inspect one or more of the foil, the object, and radiation emitted or received by the radiation emission directing device.

* * * * *